Patented Mar. 2, 1948

2,436,839

UNITED STATES PATENT OFFICE 2,436,839

HIGH DIELECTRIC COMPOSITION AND METHOD OF MAKING SAME

Eugene Wainer, Niagara Falls, N. Y., assignor to The Titanium Alloy Manufacturing Company, New York, N. Y., a corporation of Maine No Drawing. Application May 3, 1946, Serial No. 667,110

5 Claims. (Cl. 106—39)

The present invention relates to dielectric materials suitable for use as fillers and in ceramic compositions, and to the method of making such compositions. More particularly, the invention relates to a dielectric composition of exceptional dielectric properties which comprises essentially barium titanate combined ceramically with magnesium titanate to form a complex barium magnesium titanate, which composition is exceptionally suitable as a filler and a ceramic raw material for the preparation of dielectrics.

In Patent 2,377,910 granted June 12, 1946, the action of fluorides of calcium and magnesium upon barium titanate is described. The action of lead titanate admixed with barium or strontium titanate is described in Serial No. 465,387 filed November 12, 1942, while, in Serial No. 482,613 filed April 10, 1943, now Patent No. 2,420,692, there is described dielectric compositions prepared from two or more of the titanates of the alkaline earth metals, calcium strontium and barium. In Serial No. 508,744 filed November 2, 1943, dielectric compositions are described as manufactured by combining ceramically two or more substances having the perovskite structure; in Serial No. 490,485 filed June 11, 1943, now Patent No. 2,402,515, improved dielectrics prepared from the titanates and stannates of alkaline earth metals are described while, in Serial No. 508,743 filed November 2, 1943, now Patent No. 2,402,516, combinations of alkaline earth metal zirconates combined with barium titanate are disclosed.

In the present invention I have found that unusual electrical properties are imparted to barium titanate when a small amount of magnesium titanate is combined therewith or that a final composition of barium titanate and magnesium titanate is formed when barium titanate of perovskite structure and magnesium titanate of hexagonal structure are sintered together.

As in the previous inventions, barium titanate may be considered as the general building block used as a base from which the ceramic composition of the present invention is described. The electrical properties of barium titanate, when controlled, make it eminently suitable for use in preparation of capacitors for radio, radar, television and communications equipment generally as devices for capacitative coupling of power and communication lines, in electro-mechanical devices, telephone and oscillator designs, in piezoelectric applications, and in short wave techniques generally.

However, when barium titanate is used alone as the sole source for preparation of the dielectric material it produces a dielectrical which suffers from a number of defects which impart critical limitations upon the general usefulness of barium titanate. Barium titanate may be used as a filler for dielectrics of the resin type and paper type but more importantly, it can be formed directly into a capacitor by suitable molding or forming with firing to vitrification in the well-known ceramic fashion. When fired, the vitreous barium titanate has these general properties measured at one megacycle:

Dielectric constant_____About 1200
Power factor per cent_____About 1.1

The direct current resistivity at room temperature in ohm centimeters is within the range $5 \times 10^{11}$ to $1 \times 10^{12}$. Its dielectric strength is about 75 volts per mil measured at room temperature. However, the dielectric strength drops precipitously when the temperature is raised.

In considering barium titanate alone, therefore, it is found that for best all purpose use the power factor is too high, the resistivity too low and the dielectric strength too low. Furthermore, where barium titanate is used alone as the capacitor material, very poor life characteristics are observed, particularly when operations are performed at elevated temperatures or at high stress voltages for any protracted period of time. Under such conditions the material fails very readily as a capacitor and is said to have poor life characteristics.

It is an object of the present invention to regulate the electrical properties of barium titanate to remedy the defects in barium titanate as a capacitor material.

I have found that by substituting a small amount of MgO for an equimolecular amount of BaO in the $BaTiO_3$ structure, a pronounced improvement takes place. When fired into a vitreous structure such a composition has a power factor almost half that of straight $BaTiO_3$, a dielectric constant 25% higher, a resistivity of $1.0 \times 10^{14}$ ohms, a dielectric strength almost twice that of $BaTiO_3$, a much higher dielectric strength at elevated temperatures. In spite of all the improved characteristics listed above, the most important improvement obtained is the sharp increase of life expectancy of the barium magnesium titanate over the straight $BaTiO_3$. Operating at 85° C. and a stress of 14 volts per mil. a regular $BaTiO_3$ capacitor will fail in a few hundred hours, seldom over 400. Under the same conditions my novel barium titanate has a life of several thousand hours. Pieces on such life test did not show failure after 6 months. In a similar life test at 85° C. and a stress of 50 volts per mil, regular BaTiO3 fails in a few hours while the magnesia modified material has a life of several hours. At room temperature and a stress of 100 volts per mil, regular BaTiO3 will fail immediately due to puncture, while the magnesia modified material withstands such a stress adequately.

Though my novel dielectric material may be prepared by mixing BaTiO3 and MgTiO3 in the proper proportions, I prefer to first premix the raw ingredients from which these compounds are made, and then fire until combination is obtained. Suitable raw materials for the purpose of my invention are the carbonates of barium and magnesium and the pigment grade titanium dioxide of commerce. 200.0 grams of such BaCO3 is equivalent to 1 mole of BaO while 100 grams of precipitated magnesium carbonate is equivalent to one mole of MgO. Generally 80 grams of pigment titanium dioxide is equivalent to one mole of the respective oxide ingredient will naturally vary with the purity of the raw material in question.

The molar ratio of BaO:MgO must be held within relatively narrow limits in order to obtain the beneficial results listed above. Such molar ratio is between 0.98 mole BaO to 0.02 mole of MgO and 0.96 mole BaO to 0.04 mole MgO. The optimum is at 0.97 mole BaO to 0.03 mole MgO. The minimum RO:TiO2 ratio is 1:1 where R is equal to the Ba and Mg though beneficial results are available by extending the RO:TiO2 to a maximum of 1.05:1.0 while the BaO:MgO ratio making up the RO content is kept constant.

In the practice of my invention I prefer to use the precipitated carbonates as the source of the respective alkaline earth oxides and the pure titanium oxide of commerce used as a paint pigment for the titania source. The respective ingredients are first thoroughly blended dry in a double cone blender, then passed through a disintegrating pulverizer for complete mixing. The batch is then calcined at 2250° F. for 3 hours. After cooling, the batch is milled wet to a fineness such that it will pass a 325 mesh screen. The slip is lawned to remove oversize dirt and passed through a magnetic separator to remove iron bearing materials. After drying, the product is ready for use.

In preparation, the dry powder is mixed with 10% water and is then pressed in a steel die at a pressure of 5000 pounds per square inch. After drying, the pressed pieces are fired at 2450° F. for 3 hours in an oxidizing atmosphere. After cooling, the opposing parallel surfaces are painted with silver paste which is subsequently fired on at 1500° F.

Having described my invention, the following examples are indications of my method of practice but are not limitative thereof.

Table I

|   | Barium Carbonate | Magnesium Carbonate | Titanium Dioxide |
|---|---|---|---|
| A | 196.0 | 2.00 | 80 |
| B | 194.0 | 3.00 | 80 |
| C | 192.0 | 4.00 | 80 |
| D | 198.0 | 3.06 | 80 |
| E | 204.0 | 3.15 | 80 |

The above dry materials are dry mixed, calcined for 3 hours at 2250° F., milled wet through 325 mesh, cleaned by lawning and magnetic separation, dried, blended with 10% water, pressed at 5000 pounds per square inch, fired at 2450° F. for 3 hours, silver electrodes attached, and the electrical characteristics determined at one megacycle as follows in Table II:

Table II

|   | Dielectric Constant | Power Factor, Per cent | D. C. Resistivity | D. C. Voltage Breakdown |
|---|---|---|---|---|
|   |   |   | Ohm-cm. | Volts per mil |
| A | 1,405 | 0.76 | $0.8 \times 10^{14}$ | 105 |
| B | 1,610 | 0.61 | $1.0 \times 10^{14}$ | 135 |
| C | 1,350 | 0.57 | $1.1 \times 10^{14}$ | 140 |
| D | 1,780 | 0.64 | $5.0 \times 10^{13}$ | 110 |
| E | 1,995 | 0.67 | $1.0 \times 10^{13}$ | 100 |
| Regular BaTiO3 | 1,200 | 1.10 | $1.0 \times 10^{12}$ | 75 |

What is claimed is:

1. A ceramic dielectric comprising essentially barium titanate with a small admixture of magnesium titanate, the mole ratio between barium oxide and magnesium oxide being between about 0.98 mole BaO to 0.02 mole MgO and 0.96 mole BaO to 0.03 mole MgO.

2. A ceramic dielectric comprising essentially barium titanate with a small admixture of magnesium titanate, the mole ratio between barium oxide and magnesium oxide content being about 0.97 mole BaO to 0.3 mole MgO.

3. Composition in accordance with claim 1 where the ratio of RO:TiO2, where R is barium or magnesium, is between 1:1 and 1.05:1.

4. The method of regulating the dielectric properties of barium titanate which comprises ceramically incorporating a small amount of magnesium titanate with the barium titanate, the ratio between barium oxide and magnesium oxide content being between about 0.98 mole BaO to 0.02 mole MgO and 0.96 mole BaO to 0.03 mole MgO.

5. The method of regulating the dielectric properties of barium titanate which comprises ceramically incorporating a small amount of magnesium titanate with the barium titanate, the ratio between barium oxide and magnesium oxide content being about 0.97 mole BaO to 0.03 mole MgO.

EUGENE WAINER.